US012682429B2

(12) United States Patent
Raichelgauz

(10) Patent No.: US 12,682,429 B2
(45) Date of Patent: Jul. 14, 2026

(54) LEARNING LANE GEOMETRY BY AERIAL AND GROUND PERSPECTIVES

(71) Applicant: AUTOBRAINS TECHNOLOGIES LTD, Tel Aviv-Jaffa (IL)

(72) Inventor: Igal Raichelgauz, Tel Aviv (IL)

(73) Assignee: AUTOBRAINS TECHNOLOGIES LTD, Tel Aviv (IL)

( * ) Notice: Subject to any disclaimer, the term of this patent is extended or adjusted under 35 U.S.C. 154(b) by 319 days.

(21) Appl. No.: 18/356,152

(22) Filed: Jul. 20, 2023

(65) Prior Publication Data

US 2025/0029209 A1 Jan. 23, 2025

(51) Int. Cl.
| | |
|---|---|
| *G06T 7/70* | (2017.01) |
| *G06T 5/50* | (2006.01) |
| *G06T 5/80* | (2024.01) |

(52) U.S. Cl.
CPC .................. *G06T 5/50* (2013.01); *G06T 5/80* (2024.01); *G06T 7/70* (2017.01); *G06T 2207/10032* (2013.01); *G06T 2207/20081* (2013.01); *G06T 2207/20084* (2013.01); *G06T 2207/30256* (2013.01)

(58) Field of Classification Search
CPC . G06T 2207/10032; G06T 2207/20081; G06T 2207/30256; G06V 10/82; G06V 20/588
See application file for complete search history.

(56) References Cited

U.S. PATENT DOCUMENTS

| | | | |
|---|---|---|---|
| 11,628,859 B1 * | 4/2023 | Zhou ..................... | B60W 40/06 |
| | | | 701/301 |
| 2017/0369057 A1 * | 12/2017 | Gurghian ............... | G06V 10/82 |

FOREIGN PATENT DOCUMENTS

| | | | |
|---|---|---|---|
| CN | 116434088 A * | 7/2023 | ............. G06V 20/17 |

OTHER PUBLICATIONS

Regmi, Krishna, and Ali Borji. "Cross-view image synthesis using conditional gans." Proceedings of the IEEE conference on Computer Vision and Pattern Recognition. (Year: 2018).*

* cited by examiner

*Primary Examiner* — Vu Le
*Assistant Examiner* — Zaid Muhammad Saleh
(74) *Attorney, Agent, or Firm* — RECHES PATENTS

(57) ABSTRACT

A method for lane detection, the method includes (a) determining, by a lane detection neural network (NN) and based on locations of one or more road lanes within an aerial image, locations of the one or more road lanes on a ground vehicle acquired (GVA) image; and (b) responding to the determining of the locations of the one or more road lanes on the GVA image. The lane detection NN was trained to perform aerial-images-to-GVA-images conversion. The aerial image was generated by a first NN, based in the GVA image. The first NN was trained to perform GVA-images-to-aerial-images conversion. The GVA image was acquired by a two dimensional camera of a ground vehicle. The one or more locations of the one or more road lanes within the aerial image are provided by a second NN that was trained to perform lane detection in arial images.

16 Claims, 3 Drawing Sheets

Figure 1:
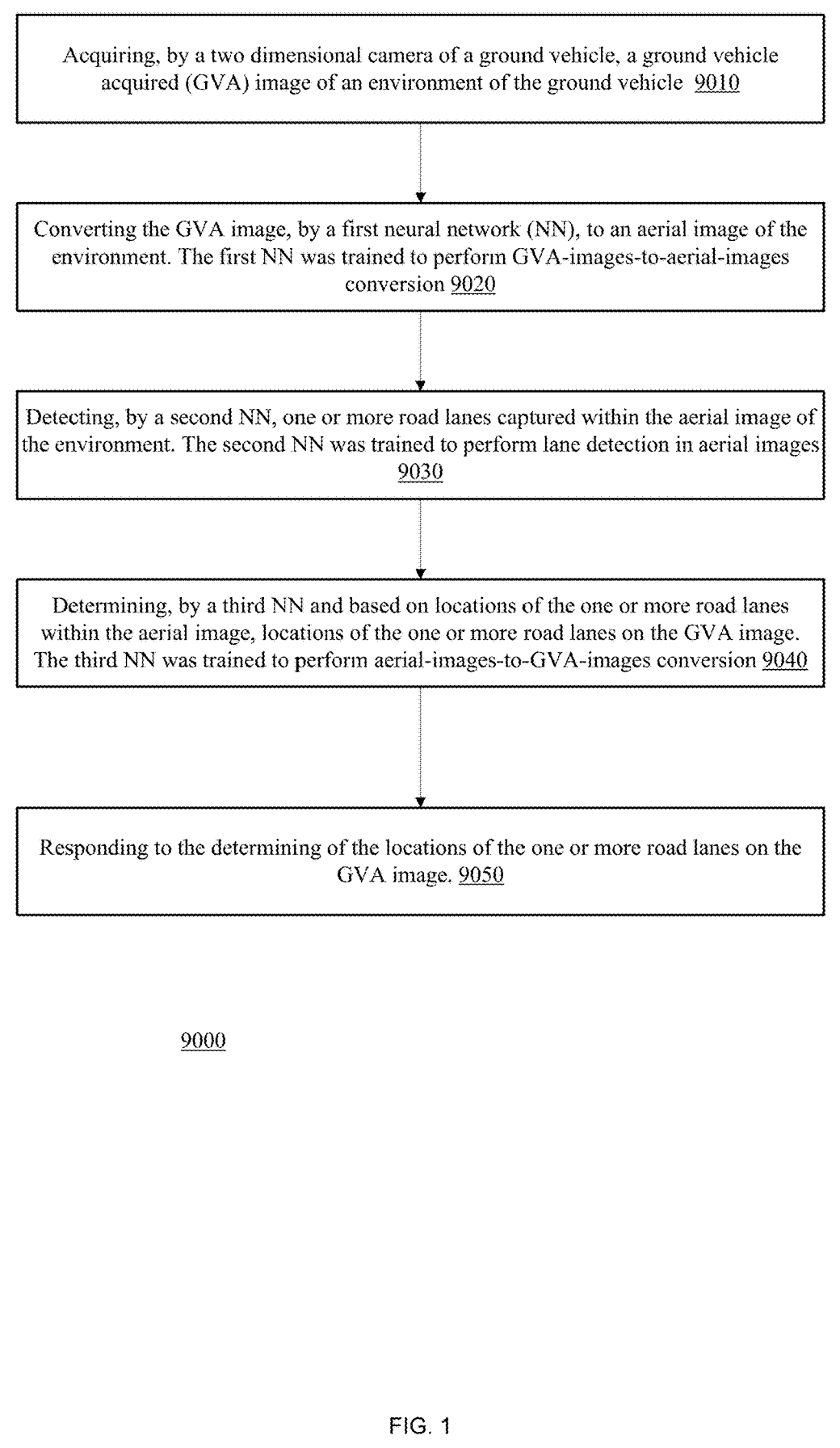

Acquiring, by a two dimensional camera of a ground vehicle, a ground vehicle acquired (GVA) image of an environment of the ground vehicle 9010

Converting the GVA image, by a first neural network (NN), to an aerial image of the environment. The first NN was trained to perform GVA-images-to-aerial-images conversion 9020

Detecting, by a second NN, one or more road lanes captured within the aerial image of the environment. The second NN was trained to perform lane detection in aerial images 9030

Determining, by a third NN and based on locations of the one or more road lanes within the aerial image, locations of the one or more road lanes on the GVA image. The third NN was trained to perform aerial-images-to-GVA-images conversion 9040

Responding to the determining of the locations of the one or more road lanes on the GVA image. 9050

One or more vehicle sensors 211

Communication module 213

Memory unit  212

First NN 221

Second NN 222

Third NN 223

Processor  216

Autonomous vehicle module 214

ADAS module 218

200

53

LEARNING LANE GEOMETRY BY AERIAL AND GROUND PERSPECTIVES

BACKGROUND

Lane detection is a building block of autonomous driving and advanced driver assistance systems (ADAS) operations. Lane detection may be used for maintaining the lane of the vehicle. In order to maintain the lane there is a need to determine which steering actions are required in order to maintain the lane.

Lane detection includes processing images acquired by a vehicle camera. The processing includes transforming image coordinates to real world coordinates. The transforming is based on various assumptions regarding the image acquisition conditions (for example optical axis of the camera), and on environmental conditions such as flatness and/or straightness of the road in front of the vehicle.

When one or more of the various assumptions is inaccurate (for example—a tilted optical axis, a curved road, and the like) the transforming is inaccurate and the lane detection is faulty.

There is a need to provide an accurate transformation and an accurate method for lane detection.

BRIEF DESCRIPTION OF THE DRAWINGS

The embodiments of the disclosure will be understood and appreciated more fully from the following detailed description, taken in conjunction with the drawings in which:

FIG. 1 illustrates an example of a method.

DESCRIPTION OF EXAMPLE EMBODIMENTS

Figure 2:
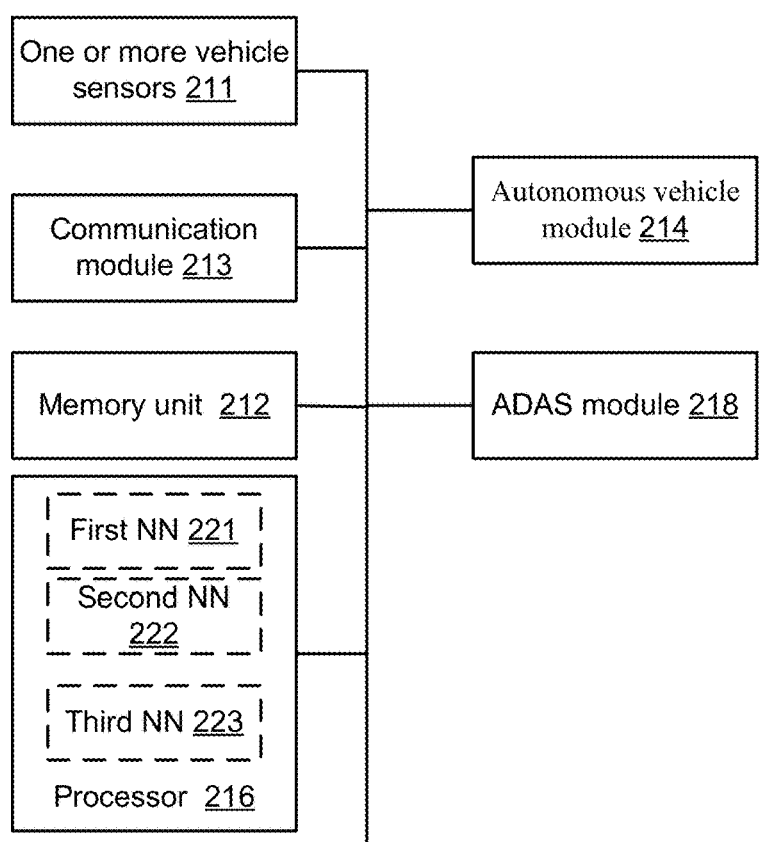
FIG. 2 illustrates a system.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of the perception unit, narrow AI agents, intersection related driving decision unit may be implemented in hardware and/or code, instructions and/or commands stored in a non-transitory computer readable medium, may be included in a vehicle, outside a vehicle, in a mobile device, in a server, and the like.

The vehicle may be any type of vehicle that a ground transportation vehicle, an airborne vehicle, and a water vessel.

The specification and/or drawings may refer to a processor. The processor may be a processing circuit. The processing circuit may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Aerial images may be acquired by any aerial unit such as a drone, an airplane, a satellite, and the like.

The Following Terms and/or Abbreviations are Used:
GVA image—a round-vehicle-acquired (GVA) image.
Aerial-images-to-GVA-images conversion—a conversion of aerial images to GVA-images.
GVA-images-to-aerial-images conversion—a conversion of GVA images t aerial images.

There is provided a method for lane detection that performs multiple machine learning conversions of information. Using neural networks (NNs) for performing each machine learning based conversion does not depend upon various assumptions related to the image acquisition conditions and/or to the environmental conditions—and thus is accurate and robust.

The suggested method is highly accurate, may be executed in real time (processing multiple images per second) and may save computational and/or memory resources as it obliviates the need to use expensive and accurate compensations schemes for overcoming errors in various assumptions regarding the image acquisition process and/or the environment of the vehicle.

Using an aerial map may be especially beneficial in cases where the vehicle does not have detailed (non-aerial) maps—for example when the vehicle has to relay on a communication link for continuously receiving detailed maps of the aeras in which the vehicle is located—or in cases that the vehicle does not have (permanently or temporarily) resources for generating and/or storing detailed maps.

FIG. 1 illustrates an example of method 9000 that is a dual transformation based method for lane detection.

Method 9000 may start by step 9010 of acquiring, by a two dimensional camera of a ground vehicle, a ground-vehicle-acquired (GVA) image of an environment of the ground vehicle.

Step 9010 may be followed by step 9020 of converting the GVA image, by a first neural network (NN), to an aerial image of the environment. The first NN was trained to perform GVA-images-to-aerial-images conversion.

The first NN may be trained by feeding the first NN with (i) GVA images acquired by two dimensional cameras one or more ground vehicles aerial, and (ii) aerial images acquired, in parallel to the GVA images, by one or more drones that followed the one or more ground vehicles. The term "followed" may mean maintain the ground vehicle within a range that enable the drones to acquire images of the environments captured by the GVA images. The drones may be located, during aerial image acquisition, at a fixed distance and/or a fixed angle in relation to the vehicles—but this is not necessarily so and the distance and/or angle may vary over time.

The first NN may be of various architectures—for example it may be an encoder decoder NN. The first NN may use any loss function during the training—for example a mean square error loss function, and the like. The loss function may be defined to optimize the GVA-images-to-aerial-images conversion.

The first NN may be a generative adversarial network (GAN), which uses a generator NN to create the aerial image (when fed with a GVA image), and a discriminator NN to provide a loss over the difference between images (GVA and aerial).

The difference between the GVA and aerial images may be defined, as a function of (for example an average of) (i) the discriminator loss (looks at the entire image), and (ii) a lateral/horizontal distance between the original lane line (in the GVA) and the constructed lane line (in the aerial image)—this may take into account only at the lanes region of the images.

The training is aimed to provide an optimal (or at least a certain quality) reconstruction of image semantic. This semantic reconstruction may differ from per-pixel reconstruction, by at least some of the following:

In Per-pixel reconstruction each pixel should be similar to the original image, in terms of red, green and blue (RGB) values.

In semantic reconstruction the general components of the image are present, even if the RGB values of each pixel are a little bit different.

When applying semantic reconstruction semantic "general components" are the road and lanes and their shape. Specifically the lane shape that may represented by lane metadata such as offset, heading, curvature, and curvature rate).

Step 9020 may be followed by step 9030 of detecting, by a second NN, one or more road lanes captured within the aerial image of the environment. The second NN was trained to perform lane detection in aerial images.

Step 9030 may be followed by step 9040 of determining, by a third NN (also referred to as a lane detection NN) and based on locations of the one or more road lanes within the aerial image, locations of the one or more road lanes on the GVA image. The lane detection NN was trained to perform aerial-images-to-GVA-images conversion.

The lane detection NN may be trained by feeding the lane detection NN with (i) GVA images acquired by two dimensional cameras one or more ground vehicles aerial, and (ii) aerial images acquired, in parallel to the GVA images, by one or more drones that followed the one or more ground vehicles. The term "followed" may mean maintain the ground vehicle within a range that enable the drones to acquire images of the environments captured by the GVA images. The drones may be located, during aerial image acquisition, at a fixed distance and/or a fixed angle in relation to the vehicles—but this is not necessarily so and the distance and/or angle may vary over time.

From a point of view of the lane detection NN, the method includes (a) determining, by a lane detection neural network (NN) and based on locations of one or more road lanes within an aerial image, locations of the one or more road lanes on a ground-vehicle-acquired (GVA) image: and (b) responding to the determining of the locations of the one or more road lanes on the GVA image. The lane detection NN was trained to perform aerial-images-to-GVA-images conversion. The aerial image was generated, by a first NN, based in the GVA image. The first NN was trained to perform GVA-images-to-aerial-images conversion. The GVA image was acquired by a two dimensional camera of a ground vehicle. Locations of the one or more road lanes within the aerial image are provided by a second NN that was trained to perform lane detection in arial images.

The lane detection NN may be trained to provide the inverse conversion from the first NN.

The lane detection NN may be of various architectures—for example it may be an encoder decoder NN. The lane detection NN may use any loss function during the training—for example mean square error loss function, and the like. The loss function may be defined to optimize the conversion.

The lane detection NN may be a generative adversarial network (GAN), which uses a generator NN to create the GVA image (when fed with an aerial image), and a discriminator NN to provide a loss over the difference between images (aerial and GVA).

Step 9040 may be followed by step 9050 of responding to the determining of the locations of the one or more road lanes on the GVA image.

Step 9040 may include at least one out of:

Displaying, on the GVA image, the one or more road lanes.

Performing an autonomous driving related operation based on the one or more road lanes. The autonomous driving related operation may include autonomously maintaining the vehicle within a current lane of the vehicle, autonomously changing a lane, maintaining any aspect of the autonomous driving (speed, direction, acceleration), changing one or more aspect of the autonomous driving.

Performing an ADAS operation based on the one or more road lanes.

FIG. 2 illustrates a system 200 having one or more vehicle sensors 211 (such as a camera), memory unit 212, communication module 213, autonomous vehicle module 214 for autonomous driving, initial location estimation module (such as GPS—or other than GPS) 215, processor 216 (may include one or more processing circuits), ADAS module 218, first NN 221, second NN 222 and lane detection NN 223. Any one of the first NN, second NN and lane detection NN may be implemented by processor 216. Different NNs may be executed by different processing circuits or one or more processors.

The processor 216 may perform the steps of method 9000.

Method 9000 may be executed by processor 216. Method 9000 may be executed by processor 216 and one or more vehicle sensors 211. The processor 216 may belong to a vehicle computer, to a remote computer such as a cloud server, and the like. There may be provide multiple processors that may execute method 9000.

Figure 3:
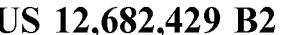
FIG. 3 illustrates an image.

FIG. 3 illustrates an image 53 of an environment in front of a vehicle—the environment includes a dual lane road (first lane 11 and second lane 12), on which lane boundaries 21 and 23 (of first lane 11) as well as lane boundaries 22 and 24 (of second lane 12) are displayed. Image 53 may be provided as input to method 9000.

There is provides a method for lane detection, the method includes (a) determining, by a lane detection neural network (NN) and based on locations of one or more road lanes within an aerial image, locations of the one or more road lanes on a ground vehicle acquired (GVA) image: and (b) responding to the determining of the locations of the one or more road lanes on the GVA image. The lane detection NN was trained to perform aerial-images-to-GVA-images conversion. The aerial image was generated, by a first NN, based in the GVA image. The first NN was trained to perform GVA-images-to-aerial-images conversion. The GVA image was acquired by a two dimensional camera of a ground vehicle. The locations of the one or more road lanes within the aerial image are provided by a second NN that was trained to perform lane detection in arial images.

According to an embodiment, the responding includes displaying, on the GVA image, the one or more road lanes.

According to an embodiment, the responding includes triggering a display, on the GVA image, the one or more road lanes According to an embodiment, the responding includes providing information about the locations of the one or more road lanes on the GVA image.

According to an embodiment, the responding includes providing information about the locations of the one or more road lanes on the GVA image for use in performing a driving related operation.

According to an embodiment, the responding includes performing an autonomous driving related operation based on the one or more road lanes.

According to an embodiment, the responding includes autonomously maintaining the vehicle within a current lane of the vehicle.

According to an embodiment, wherein the first NN was trained by feeding the first NN with (i) GVA images acquired by two dimensional cameras one or more ground vehicles aerial, and (ii) aerial images acquired, in parallel to the GVA images, by one or more drones that followed the one or more ground vehicles.

According to an embodiment, the first NN is an encoder decoder.

According to an embodiment, the first NN is a generative adversarial network (GAN).

According to an embodiment, the method includes training at least one NN of the first NN, the second NN or the lane detection NN.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected." or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuit located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

I claim:

1. A method for lane detection, the method comprises:
(a) determining, by a lane detection neural network (NN) and based on locations of one or more road lanes within an aerial image, locations of the one or more road lanes on a ground-vehicle-acquired (GVA) image; and
(b) responding to the determining of the locations of the one or more road lanes on the GVA image;
wherein the lane detection NN was trained to perform aerial-images-to-GVA-images conversion;
wherein the aerial image was generated, by a first NN, based in the GVA image and is not acquired by an aerial camera:
wherein the first NN was trained to perform GVA-images-to-aerial-images conversion;
wherein the GVA image was acquired by a two dimensional camera of a ground vehicle; and
wherein the locations of the one or more road lanes within the aerial image are provided by a second NN that was trained to perform lane detection in arial images;
wherein the first NN is a generative adversarial network (GAN) which uses (a) a generator NN to create the aerial image, and (b) a discriminator NN to provide a loss over a difference that is a function of (i) a discriminator loss the looks at the GVA image in its entirety and the aerial image in its entirety, and (ii) a lateral/horizontal distance between the original lane line within the GVA image and the constructed lane line within the aerial image; wherein the function is an average of (i) the discriminator loss the looks at the GVA image in its entirety and the aerial image in its entirety, and (ii) the lateral/horizontal distance between the original lane line within the GVA image and the constructed lane line within the aerial image.

2. The method according to claim 1, wherein the responding comprises providing information about the locations of the one or more road lanes on the GVA image for use in performing a driving related operation.

3. The method according to claim 1, comprising performing an autonomous driving related operation based on the one or more road lanes.

4. The method according to claim 1, comprising autonomously maintaining the vehicle within a current lane of the vehicle.

5. The method according to claim 1, wherein the first NN was trained by feeding the first NN with (i) GVA images acquired by two dimensional cameras one or more ground vehicles aerial, and (ii) aerial images acquired, in parallel to the GVA images, by one or more drones that followed the one or more ground vehicles.

6. The method according to claim 1, comprising training at least one NN of the first NN, the second NN or the lane detection NN.

7. A non-transitory computer readable medium for lane detection, the non-transitory computer readable medium stores instructions for:
determining, by a lane detection neural network (NN) and based on locations of one or more road lanes within an aerial image, locations of the one or more road lanes on a ground-vehicle-acquired (GVA) image; and
responding to the determining of the locations of the one or more road lanes on the GVA image;
wherein the lane detection NN was trained to perform aerial-images-to-GVA-images conversion;
wherein the aerial image was generated, by a first NN, based in the GVA image and is not acquired by an aerial camera;
wherein the first NN was trained to perform GVA-images-to-aerial-images conversion;
wherein the GVA image was acquired by a two dimensional camera of a ground vehicle; and
wherein the locations of the one or more road lanes within the aerial image are provided by a second NN that was trained to perform lane detection in arial images; and
wherein the first NN is a generative adversarial network (GAN) which uses (a) a generator NN to create the aerial image, and (b) a discriminator NN to provide a loss over a difference that is a function of (i) a discriminator loss the looks at the GVA image in its entirety and the aerial image in its entirety, and (ii) a lateral/horizontal distance between the original lane line within the GVA image and the constructed lane line within the aerial image; wherein the function is an average of (i) the discriminator loss the looks at the GVA image in its entirety and the aerial image in its entirety, and (ii) the lateral/horizontal distance between the original lane line within the GVA image and the constructed lane line within the aerial image.

8. The non-transitory computer readable medium according to claim 7, comprising performing an autonomous driving related operation based on the one or more road lanes.

9. The non-transitory computer readable medium according to claim 7, comprising autonomously maintaining the vehicle within a current lane of the vehicle.

10. The non-transitory computer readable medium according to claim 7, wherein the first NN was trained by feeding the first NN with (i) GVA images acquired by two dimensional cameras one or more ground vehicles aerial, and (ii) aerial images acquired, in parallel to the GVA images, by one or more drones that followed the one or more ground vehicles.

11. The non-transitory computer readable medium according to claim 7, comprising training at least one NN of the first NN, the second NN or the lane detection NN.

12. The method according to claim 1, wherein the responding comprises displaying, on the GVA image, the one or more road lanes.

13. The method according to claim 1, wherein the responding comprises triggering a display, on the GVA image, the one or more road lanes.

14. The method according to claim 1, wherein the responding comprises providing information about the locations of the one or more road lanes on the GVA image.

15. The non-transitory computer readable medium according to claim 7 wherein the responding comprises displaying, on the GVA image, the one or more road lanes.

16. The non-transitory computer readable medium according to claim 7, wherein the responding comprises providing information about the locations of the one or more road lanes on the GVA image for use in performing a driving related operation.

\* \* \* \* \*